(12) United States Patent
Guan et al.

(10) Patent No.: US 8,146,622 B2
(45) Date of Patent: Apr. 3, 2012

(54) SWITCH AND HOSE-VALVE CONNECTION ARRANGEMENT FOR VEHICLE TEMPORARY MOBILITY KIT

(75) Inventors: Yingchao Guan, Jiangsu (CN); Kimberly Ann Steele, Northville, MI (US); Darryl L. Jones, Southfield, MI (US); Zhi Qiang He, Nanjing (CN); Sergey Maryanovsky, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1217 days.

(21) Appl. No.: 11/894,390

(22) Filed: Aug. 20, 2007

(65) Prior Publication Data

US 2009/0050232 A1   Feb. 26, 2009

(51) Int. Cl.
*B65B 31/00* (2006.01)
(52) U.S. Cl. ............ 141/38; 141/114; 141/197; 81/15.6
(58) Field of Classification Search ................ 141/5, 38, 141/100, 104, 105, 114, 193, 197, 231, 285, 141/313, 351; 222/372; 81/15.2, 15.6; 137/223, 137/227; 152/509
See application file for complete search history.

(56) References Cited

U.S. PATENT DOCUMENTS

| | | |
|---|---|---|
| 5,908,145 A | 6/1999 | Jaksa |
| 6,092,569 A | 7/2000 | Simmel et al. |
| 6,431,225 B1 | 8/2002 | Dudley |
| 6,789,581 B2 | 9/2004 | Cowan et al. |
| 6,938,651 B1 | 9/2005 | Carter et al. |
| 6,964,284 B2 | 11/2005 | Eckhardt |
| D557,299 S | 12/2007 | Marini et al. |
| D613,320 S | 4/2010 | Marini |
| 7,694,698 B2 | 4/2010 | Marini |
| 7,695,312 B2 | 4/2010 | Steele et al. |
| 7,789,110 B2 | 9/2010 | Marini |

(Continued)

FOREIGN PATENT DOCUMENTS

WO   2006/024534 A1   3/2006

(Continued)

OTHER PUBLICATIONS

Paul Williams, "Product Review: AirMan Tire Repair System", Canadian Driver, Oct. 15, 2004, 3 pages.

(Continued)

*Primary Examiner* — Gregory Huson
*Assistant Examiner* — Jason Niesz
(74) *Attorney, Agent, or Firm* — Fredrick V. Owens; Kristy J. Downing; Just Intellectuals, PLLC

(57) ABSTRACT

A temporary mobility kit to minimize or prevent the inadvertent outflow of tire sealant is provided. The temporary mobility kit includes a switch-inflator assembly and a removable sealant assembly. The switch-inflator assembly includes an air inflator and an associated hose for inflating a tire. The switch-inflator assembly further includes a diverter switch, a power-on, power-off switch, and an air pressure gauge. The diverter switch is a user-operated switch which moves an associated diverter valve between an air inflation function and a sealing function. The sealant assembly includes a sealant hose having a sealant tire valve connector. Electrical wires are provided in operative association with the sealant hose and electrically connect the sealant tire valve connector and the sealant assembly. A circuit arrangement is provided which prevents the inadvertent outflow of tire sealant through a logic arrangement which includes a reset circuit.

16 Claims, 5 Drawing Sheets

U.S. PATENT DOCUMENTS

| | | |
|---|---|---|
| 2005/0191193 A1 | 9/2005 | Chou |
| 2006/0021472 A1 | 2/2006 | Ragan et al. |
| 2007/0181209 A1 | 8/2007 | Stehle |
| 2008/0277044 A1 | 11/2008 | Marini |
| 2009/0066487 A1 | 3/2009 | Miller et al. |
| 2009/0193937 A1 | 8/2009 | Steele et al. |
| 2009/0266440 A1 | 10/2009 | Lolli et al. |
| 2009/0301602 A1* | 12/2009 | Lolli et al. ............ 141/38 |
| 2010/0005930 A1 | 1/2010 | Lolli et al. |

FOREIGN PATENT DOCUMENTS

| | | |
|---|---|---|
| WO | 2008/035163 A2 | 3/2008 |
| WO | 2009027792 | 3/2009 |
| WO | 2009195950 | 9/2009 |
| WO | 2009156817 | 12/2009 |

OTHER PUBLICATIONS

Author Unknown, "Notes on the safe use of the ContiComfort Kit", www.conticomfortkit.co.uk, Jul. 2007.

Richards, John, Letter of Jun. 28, 2010 from TEK Global contesting inventorhship, 2 pages.

U.S. Patent No. 7,695,312 titled "Cord Wrap and Power Receptacle Arrangement for Inflator" is now Inter Partes Reexamination U.S. Appl. No. 95/000,581, filed Dec. 9, 2010.

* cited by examiner

SWITCH AND HOSE-VALVE CONNECTION ARRANGEMENT FOR VEHICLE TEMPORARY MOBILITY KIT

TECHNICAL FIELD

The present disclosure relates generally to portable inflator units. More particularly, the present disclosure relates to temporary mobility kits for repair of vehicle tires.

BACKGROUND

Automotive manufacturers have traditionally offered spare tires with the fleet of vehicles they produce. In the early days of automobiles the spare tire was mounted externally on either the running board or on a rear-mounted tire carrier of a vehicle. To comply with advances in styling the spare tire was concealed, most typically being moved inside the vehicle's trunk. While this arrangement provided a suitable solution for placement of the spare tire for decades, changes in fuel economy requirements dictated the need for vehicle weight reduction. Manufacturers reviewed the vehicle anew in its entirety seeking ways to reduce vehicle weight. One answer to the effort to reduce overall vehicle weight was to replace the conventional, large and bulky road tire with a smaller temporary tire or "donut."

While the spare tire represents a significant decrease in overall vehicle weight, the further improvement in tire design and durability as well as the concurrent general improvement in roadways gradually began to reduce the need for relying on a spare tire at all.

In response to these advances in both tire technology and road quality, vehicle auto manufacturers have begun to substitute a spare tire for a "temporary mobility kit" (or "TMK"). The TMK includes a dual-purpose air compressor and a sealing system. The sealing system includes a sealing compound that will effectively seal most punctures caused by nails or similar objects. The air compressor drives the sealing compound into the compromised tire and subsequently, can be used to reinflate the tire. The growing trend today is for manufacturers to equip the vehicle with a temporary mobility kit within a space provided in the vehicle, such as in the spare tire well of the trunk.

While providing clear advantages over the spare tire such as weight reduction as well as providing the vehicle operators with a practical alternative over the demands of tire changing, the development of temporary mobility kits is in a continuing state of development.

SUMMARY

One embodiment of the disclosed invention is a temporary mobility kit directed to the prevention of inadvertent outflow of tire sealant. The temporary mobility kit includes a switch-inflator assembly and a removable sealant assembly. The switch-inflator assembly includes an air inflator and an associated hose for inflating a tire. The switch-inflator assembly further includes a diverter switch, a button to switch the power "on" or "off," and an air pressure gauge. The diverter switch is a user-operated switch which moves an associated diverter valve between an air inflation function and a sealing function. The sealant assembly includes a sealant hose having a sealant tire valve connector. Electrical wires are provided in operative association with the sealant hose and electrically connect the sealant tire valve connector and the sealant assembly. A circuit arrangement is provided which prevents the inadvertent outflow of tire sealant through a logic arrangement which includes a reset circuit.

Other features of the invention will become apparent when viewed in light of the detailed description when taken in conjunction with the attached drawings and the appended claims.

BRIEF DESCRIPTION OF THE DRAWINGS

For a more complete understanding of this invention, reference should now be made to the embodiment(s) illustrated in greater detail in the accompanying drawings and described below by way of examples of the invention wherein.

DETAILED DESCRIPTION

Figure 1:
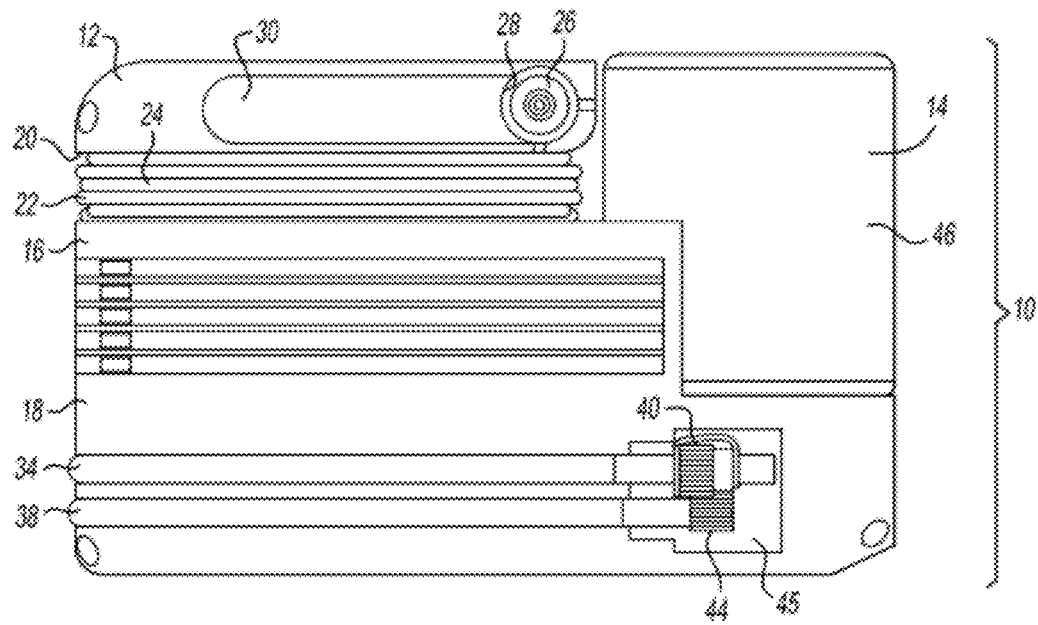
FIG. 1 illustrates a side view of an exemplary temporary mobility kit showing an electric cable, sealant bottle, sealant hose, and inflator hose in their stored conditions.

In the following figures, the same reference numerals will be used to refer to the same components. In the following description, various operating parameters and components are described for one constructed embodiment. These specific parameters and components are included as examples and are not meant to be limiting.

Figure 2:
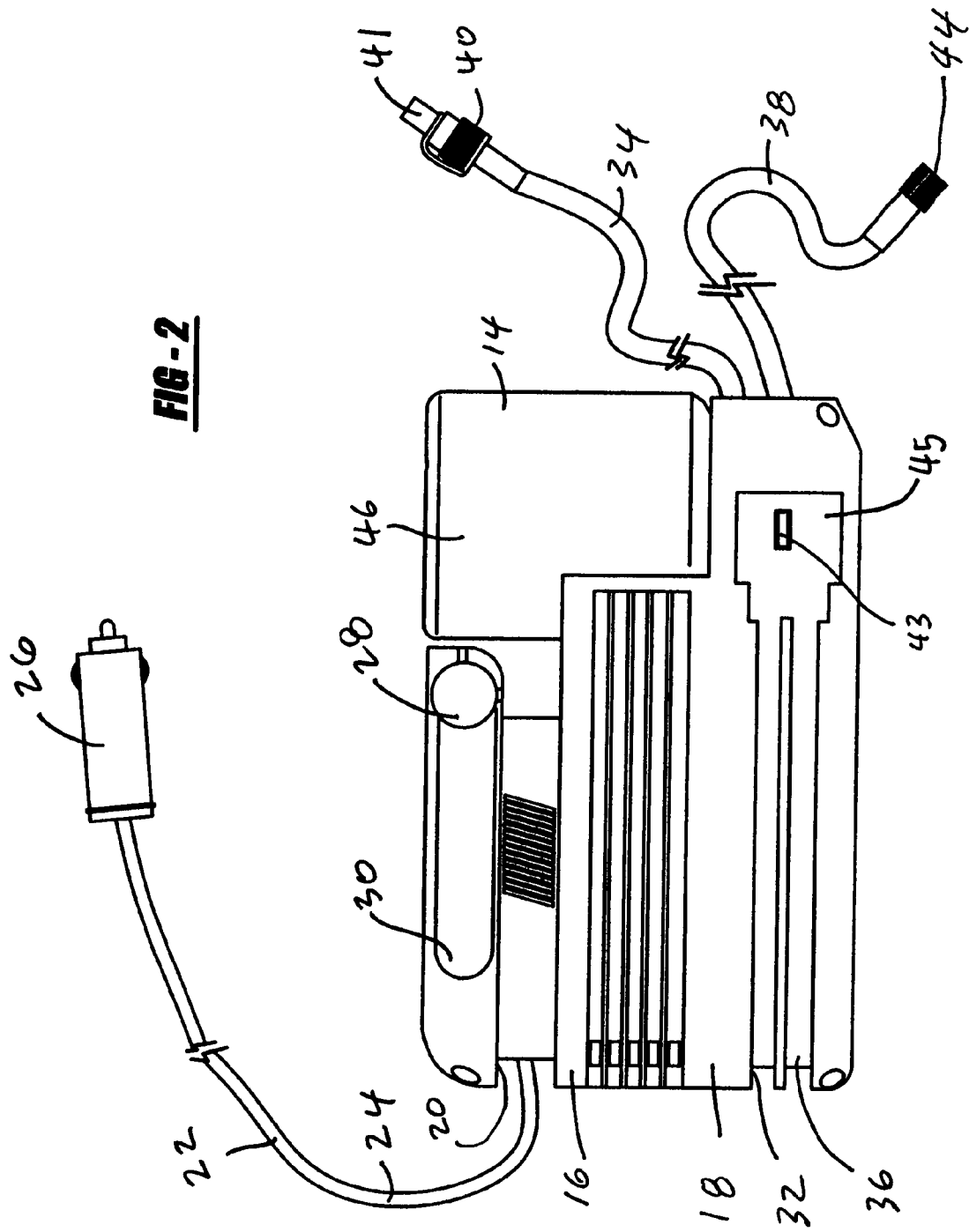
FIG. 2 is a view similar to that of FIG. 1 but showing the electrical cable, sealant hose, and inflator hose in their un-stored conditions as may be the case for repairing and inflating a tire.

Referring to the drawings and in particular to FIGS. 1 and 2, a side view of a temporary mobility kit, generally illustrated as 10, is shown. The temporary mobility kit 10 includes a switch-inflator assembly 12 and a sealant assembly 14. While preferably being a one-piece part, the switch-inflator assembly 12 includes an upper area 16 and a lower area 18.

The upper area 16 includes a peripheral recessed area 20 about which a cord portion 22 of an electrical plug assembly 24 is wrapped when the electrical plug assembly 24 is not in use. A plug 26 adapted for use in the vehicle's power point (not shown) is provided. A plug-receiving aperture 28 is provided to receive and retain the plug 26 when not in use. The peripheral recessed area 20 and the plug-receiving aperture 28 are more clearly seen in FIG. 2.

Figure 6:
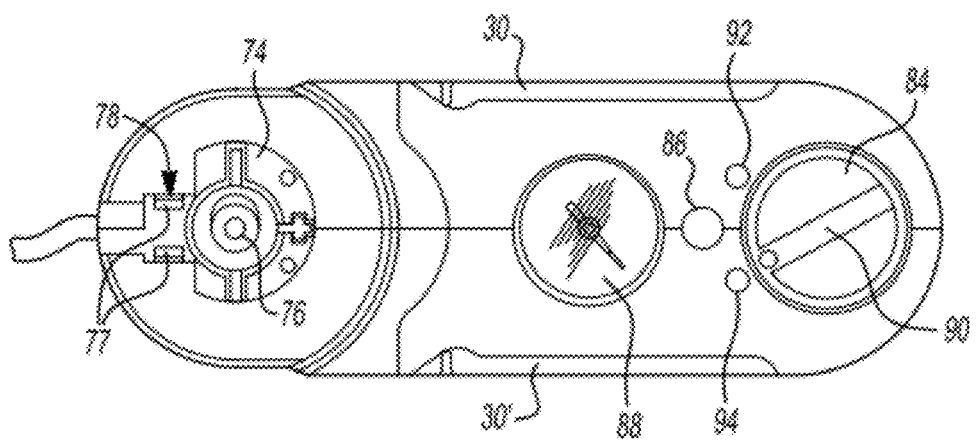
FIG. 6 is a top view of the switch-inflator assembly of the TMK of FIG. 1.

A pair of opposed channels are defined on the opposite sides of the upper area 16 of the switch-inflator assembly 12, of which only one channel, 30, is visible in FIGS. 1 and 2 (the opposite channel 30' is illustrated in FIG. 6, discussed below). The opposed channels 30, 30' (or handles) are provided to allow for the user to readily grasp and lift the temporary mobility kit 10.

The lower area 18 of the switch-inflator assembly 12 includes a first channel 32 for receiving and retaining a sealant hose 34 when the sealant hose 34 is not in use. The lower area 18 of the switch-inflator assembly 12 further includes a second channel 36 for receiving and retaining an inflator hose 38 when the inflator hose 38 is not in use. The first channel 32 and the second channel 36 are more clearly seen in FIG. 2.

Figure 8:
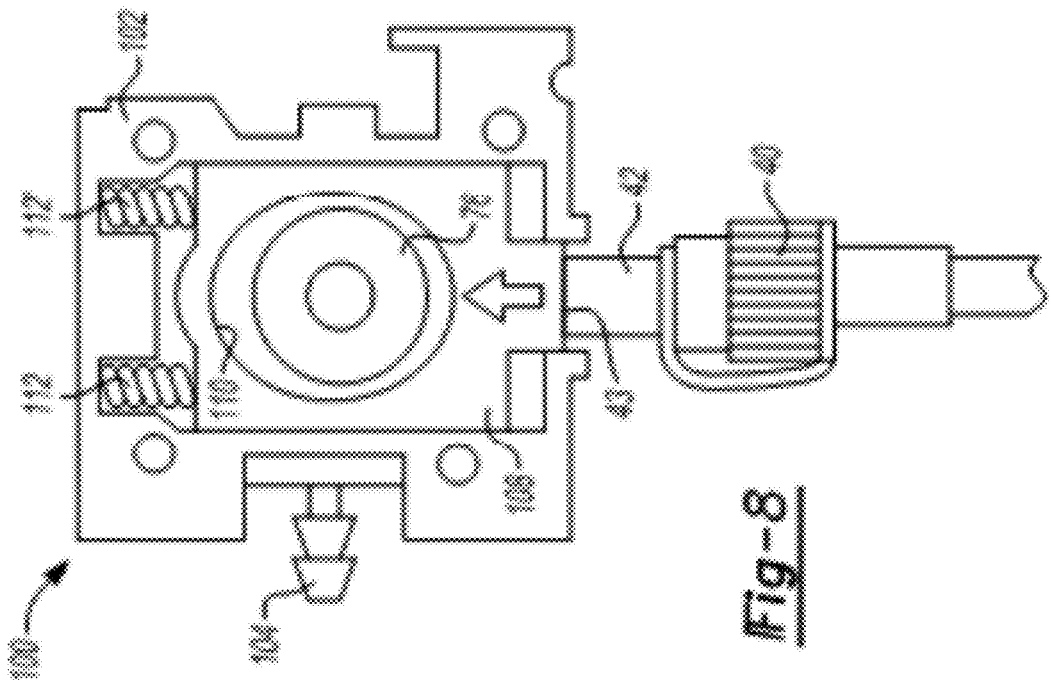
FIG. 8 is a cross-sectional view of the snap-in features of FIG. 7 in a release position.
Figure 7:
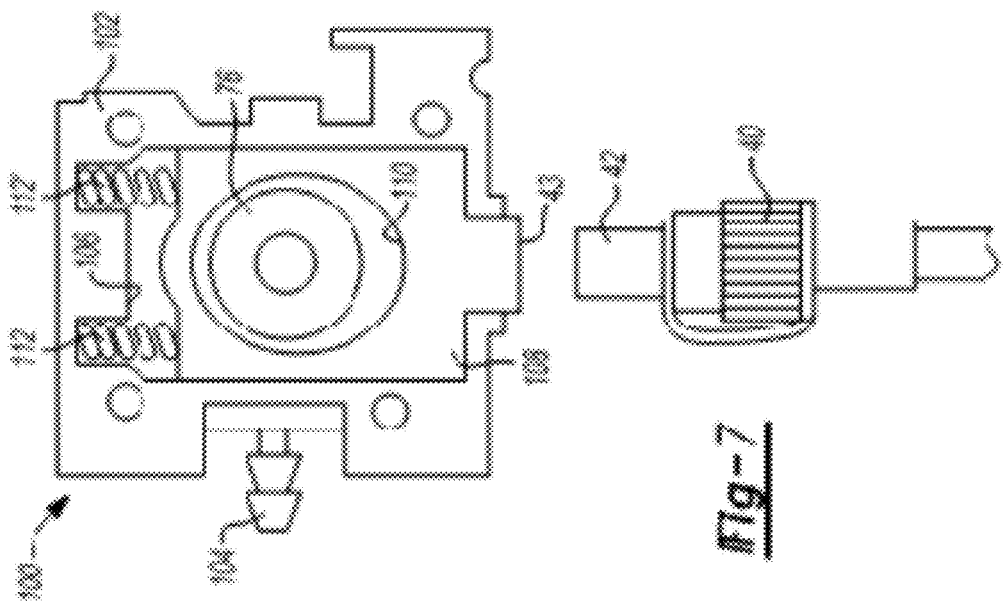
FIG. 7 is a cross-sectional view of snap-in features on the TMK in a secured position.

The sealant hose 34 includes a sealant tire valve connector 40 for releasable attachment to a tire valve. A combination dust cover or cap 41 and release tool 42 is removably attached to the sealant valve connector. The cap 41 includes a release tool 42 protruding from the outer surface of the cover portion. The release tool 42 is provided to engage a button 43 attached to a release tab which lockably engages the sealant assembly 14 to the switch-inflator assembly 12 (as shown in FIGS. 7-8). By pressing the release tool 42 against the button 43, of FIG. 2, the sealant assembly 14 may be removed from the switch-inflator assembly 12 for inspection or for replacement either because of use or because of expiration of the warranty period.

The inflator hose 38 also includes an inflator tire valve connector 44 for releasable attachment to a tire valve. A recessed area 45 is defined in the side of the lower area 18 for accommodating the sealant tire valve connector 40 and the inflator tire valve connector 44 when the sealant hose 34 and the inflator hose 38 are stored in the first channel 32 and the second channel 36, respectively.

The sealant assembly 14 is removably attached to the switch-inflator assembly 12. The sealant assembly 14 includes the sealant hose 34 and a sealant bottle 46. The sealant bottle 46 contains a tire sealant which, when introduced into a tire, coats the inner walls of the tire to prevent air pressure loss due to slow leaks and tread punctures. The tire sealant typically includes a solution or suspension of latex material and water. The composition can include a high molecular weight fiber component. The composition solidifies upon reaching the hole or puncture. Solidification results from a combination of exposure to air, vibration, and elevated temperature.

Figure 3:
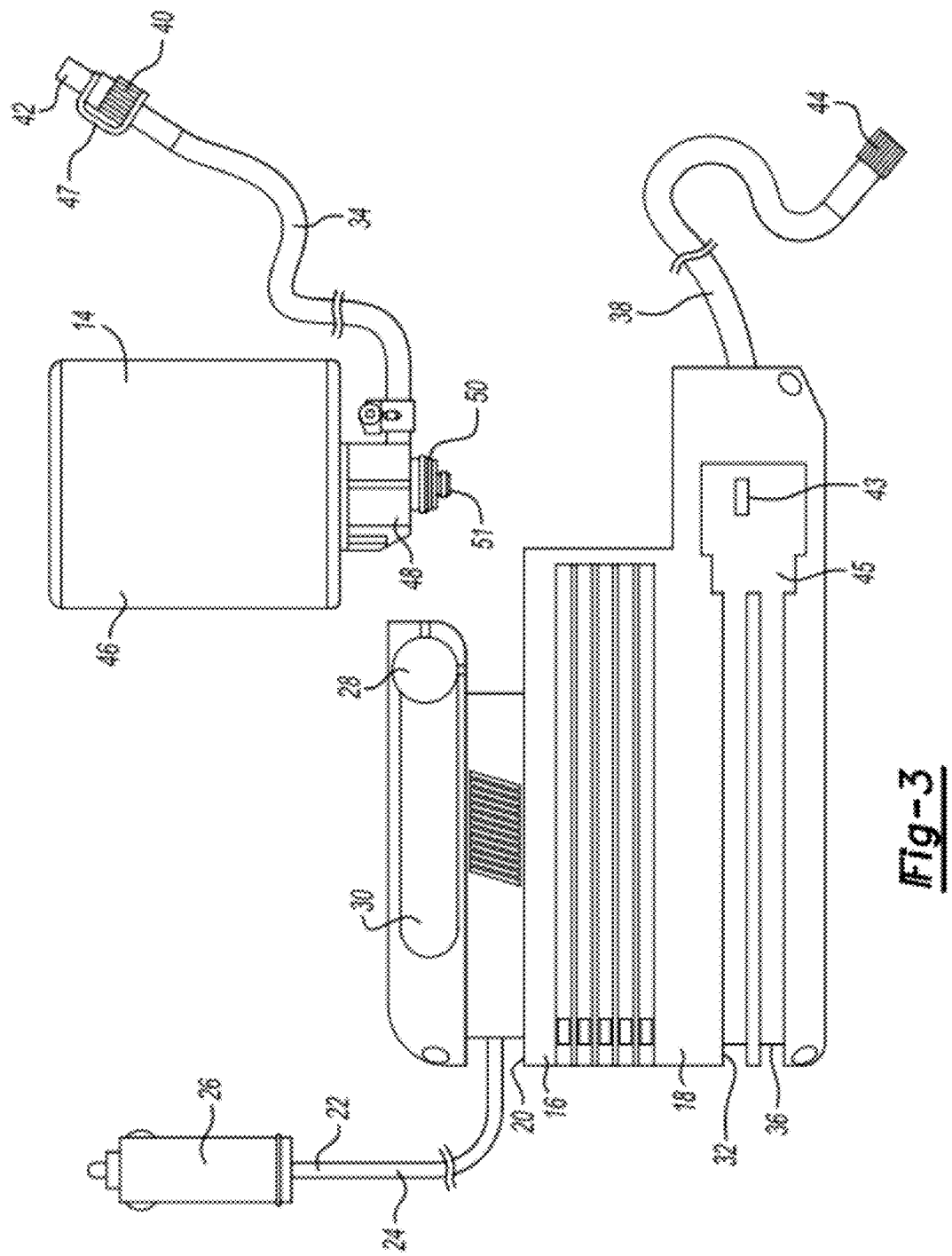
FIG. 3 is a view similar to that of FIG. 2 but illustrates the sealant assembly removed and spaced-apart from the switch-inflator assembly.

FIG. 3 is a view of the temporary mobility kit 10 similar to that of FIGS. 1 and 2 but illustrates the sealant assembly 14 being removed and spaced apart from the switch-inflator assembly 12. The sealant assembly 14 includes a base 48 which mates with a receptacle defined in the switch-inflator assembly 12. The base 48 includes a sealing arrangement such as a pair of O-rings 50 and 51 which form a fluid-tight seal with an aperture defined in the base of the receptacle (not shown). The O-rings 50 and 51 are provided to assure that no air leaks from the temporary mobility kit 10 during operation in which compressed air is pumped from the switch-inflator assembly 12, into the sealant assembly 14, and out of the sealant hose 34, carrying a quantity of the tire sealant. The O-rings 50 and 51 provide a re-sealable connection between the switch-inflator assembly 12 and the sealant assembly 14 when the sealant assembly 14 is removed for inspection or replacement.

Figure 4:
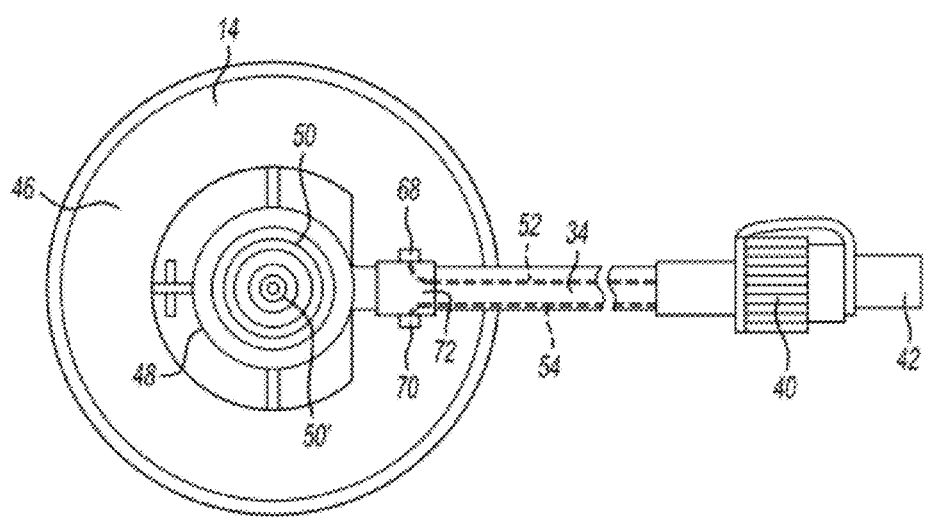
FIG. 4 is an underside view of the sealant assembly.

FIG. 4 illustrates a view of the underside of the sealant assembly. For the sake of clarity, FIG. 4 will be discussed in conjunction with FIG. 5, which illustrates a close-up view of the sealant tire valve connector 40 connected to a tire valve, both of which are shown in partial sectional views. One of the safety features is a switching arrangement that prevents the unintended release of tire sealant by the operator before the sealant tire valve connector 40 is attached to the tire valve. Once the sealant tire valve connector 40 is attached to the tire valve, a circuit is completed, and the closed circuit is identified by the temporary mobility kit 10, thus enabling the outflow of tire sealant.

More particularly, a first lead line 52 and a second lead line 54 are provided substantially within the sealant hose 34. At least one of the first lead line 52 or the second lead line 54 must be electrically insulated, either by being embedded within the wall of the sealant hose 34 or by the provision of an insulating jacket.

Figure 5:
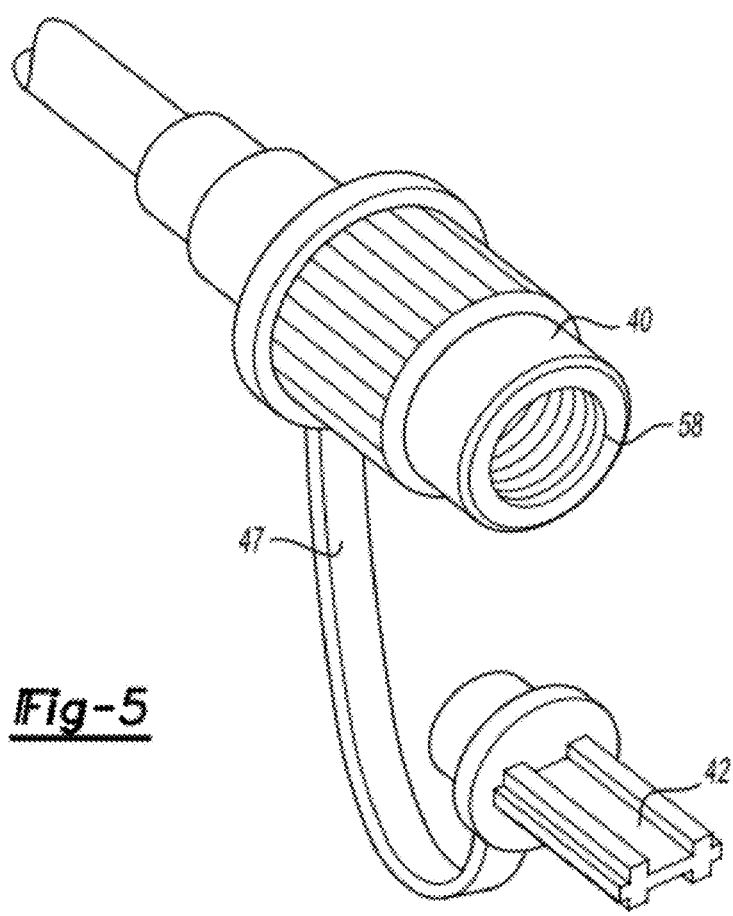
FIG. 5 is a close-up view of the valve connector of the sealant assembly in position connected with a tire valve, the tire valve connector portion and the tire valve both being shown in partial sectional views.

One end of the first lead line 52 is electrically mated to a metal flange centrally located in the sealant tire valve connector 40. One end of the second lead line 54 is electrically mated to a metal collar 58 (as shown in FIG. 5) having an internal thread which can be removably mated with a conventional tire valve stem (not shown). The conventional tire valve stem includes a metal sleeve having an external thread upon which the internal thread of the metal collar 58 of the sealant tire valve connector 40 is fastened during use and a valve assembly having an axially-displaceable valve pin (not shown).

When the metal collar 58 of the sealant tire valve connector 40 is threaded to the metal sleeve of the tire valve stem, physical and electrical contact by the centrally located metal flange of the sealant valve connector 40 are made with the axially-displaceable valve pin. An electrical circuit is thus formed between the first lead line 52 and the second lead line 54.

The first lead line 52 is also electrically mated to a first metal contact 68 fitted to the underside of the sealant assembly 14. The second lead line 54 is electrically mated to a second metal contact 70 also fitted to the underside of the sealant assembly 14. The first metal contact 68 and the second metal contact 70 are on opposite sides of a fluid connector 72 which fluidly connects the sealant hose 34 and the base 48 of the sealant assembly 14.

The first metal contact 68 and the second metal contact 70 are electrically matable with the switch-inflator assembly 12. The mating arrangement is best understood by reference to both FIGS. 4 and 6, the latter figure illustrating a top view of the switch-inflator assembly 12, shown without the sealant assembly 14. Referring particularly to FIG. 6, a receptacle 74 is defined in the switch-inflator assembly 12. The receptacle 74 releasably receives the base 48 of the sealant assembly 14. A connecting port 76 is centrally defined in the receptacle 74 for fluidly mating with the sealant bottle 46 of the sealant assembly. The O-rings 50 and 51 are engaged with the interior wall of the connecting port 76 when the sealant assembly 14 is attached to the switch-inflator assembly 12 to form a fluid-tight seal.

To provide the above-mentioned electrical mating between the first metal contact 68 and the second metal contact 70, a pair of opposed contacts 77 are provided in a recess 78 defined adjacent to and in communication with the receptacle 74. The recess 78 is formed so as to substantially receive the fluid connector 72. The pair of opposed contacts 77 include a first flat metal spring contact for electrically contacting the first metal contact 68 of the sealant assembly 14 and a second flat metal spring contact for electrically contacting the second metal contact 70 of the sealant assembly. When the sealant assembly 14 is attached to the switch-inflator assembly 12, the first metal contact 68 slidably engages the first flat metal spring contact and the second metal contact 70 slidably engages the second flat metal spring contact.

The switch-inflator assembly 12 also includes a diverter switch 84, a power-on, power-off button 86, and an air pressure gauge 88. The power-on, power-off button 86 may be of a variety of types but is preferably a momentary switch. Placement of these components as set forth in FIG. 6 is only suggestive and is not to be taken as being limiting. However, in their illustrated position(s), with each of these components being positioned on the top of the switch-inflator assembly 12 they are within easy reach of the user and also provide an easy view of the operating condition of the temporary mobility kit 10 in its relation to the tire.

The diverter switch 84 includes a knob 90 and an associated diverter valve, shown in FIG. 7. The diverter switch 84 may also be characterized as a function switch. The diverter switch 84 provides the temporary mobility kit 10 with a way of allowing (or enabling) a user to select between the sealant function and the air inflation function. The selection arrangement presented in this embodiment allows only one function to be enabled at a time. The knob 90 may be rotated between a position 92 which is the air inflation position and a position 94 which is the sealant function position. As illustrated, the position of the diverter switch 84 is in the sealant function as the knob 90 has been rotated to the position 94. In this position—and only in this position—the diverter switch 84 is open, and the tire sealant composition can be introduced into the tire only if the tire valve connector 40 is connected to the tire valve to make the circuit discussed above. Alternatively, the knob 90 may be rotated to the position 92. In this position—and only in this position—the diverter switch is closed and the tire can be inflated.

The power-on, power-off button 86 operates to engage or disengage the temporary mobility kit 10. The air pressure gauge 88 provides the user with information as to the amount of air pressure in the subject tire in real time.

FIG. 6 also shows a user-grasping channel 30' defined in the upper area 16 of the switch-inflator assembly 12 which is opposite the channel 30 shown in FIGS. 1 and 2 and discussed above in conjunction therewith.

Another of the internal components of the switch-inflator assembly is a circuit board. The circuit board or PCB board is partially hidden by its associated wiring and by the compressor motor. The configuration and position of the circuit board may be altered and the illustrated configuration and placement are to be considered suggestive and not limiting.

The circuit board is electrically connected with the electrical plug assembly 24 (as shown in FIG. 2), the pump motor, the diverter switch 84 (as shown in FIG. 6), and the valve connector 40 of FIGS. 7-8. The various operating circuits of the circuit board include a logic circuit, a pump switch circuit, a switch and logic circuit, a reset circuit, and a driver circuit. Each of the circuits will be described hereafter.

The logic circuit collects all input signals and determines whether to start or stop the control algorithm. The pump switch circuit measures the signal from the power-on, power-off button 86 (of FIG. 6) and, in addition, filters high frequency noise. Each hit on the power-on, power-off button changes the status of the logic circuit from "0" to "1" and vice versa. The final signal of the pump switch circuit is input to the logic circuit.

The switch and logic circuit measures the signals from the diverter switch and from the sealant tire valve connector 40 (as shown in FIGS. 7-8). The switch and logic circuit also inputs signal(s) to the logic circuit and to the reset circuit based on two signals, thereby providing a method of preventing inadvertent outflow of sealant compound.

The reset circuit receives power from the electrical plug assembly 24 (as shown in FIG. 3). It resets motor operation when the power is on or when there is a change in the status of the switch and logic circuit. The driver circuit includes a power integrated circuit and provides a connection for some of the internal electronic protection components.

In operation, the user removes the temporary mobility kit 10 (of FIG. 1) from its storage place in the vehicle to repair and re-inflate a tire compromised by a puncture. In its proper use the user removes the valve cap from the punctured tire and completely attaches the sealant tire valve connector 40 to the tire valve by threading. Once so engaged, the user then attaches the plug 26 of the electrical plug assembly 24 to a power point on the vehicle. The user then confirms that the knob 90—as shown in FIG. 6—is in its sealant function position 94. Having made this confirmation, the user presses the power-on, power-off button 86 once. The switch and logic circuit senses that the diverter switch 84 is in its correct position and the sealant valve connector 40 is properly attached to the tire valve. Thus confirmed, the logic circuit determines that the temporary mobility kit 10 is properly set and sealant is forced into the tire through the sealant hose 34, as shown in FIG. 1. Once the sealant has been sufficiently introduced into the tire, the temporary mobility kit 10 effects inflation of the tire, preferably without the need for the user to change the diverter switch to the air inflating position.

While the user is directed by the appropriate manual to first remove the valve cap from the punctured tire followed by attachment of the sealant tire valve connector 40 to the tire valve, it is possible that the user will inadvertently first attach the plug of the electrical plug assembly to one of the vehicle's power point and then operate the temporary mobility kit without the tire valve connection having been made (or having been attempted but made improperly). If the knob of the diverter switch is switched to the air inflating position and the user engages the temporary mobility kit by pressing the power-on, power-off button once, the pump motor will start, but only air will be pumped out through the inflator hose.

If the user then realizes that the knob is turned to the air inflating position and attempts to change the situation by rotating the knob to the sealant function position, the circuit will determine that no circuit has been completed by connection of the sealant tire valve connector and the tire valve and the reset circuit of the circuit will re-set all logic status to "0". The pump motor is thereby disabled. In the event that the user then realizes that the sealant tire valve connector has not be attached to the tire valve either at all or incompletely and attempts to attach the sealant tire valve connector to the tire valve, the pump motor will not be engaged. Since the logic status is set to "0" the user need only press the power-on, power-off button thereby switching the status of the logic circuit from "0" to "1" thus starting the temporary mobility kit which will then operate normally as described above.

With reference to FIG. 7, is a cross-sectional view of an exemplary snap-in feature on the TMK in a secured position is shown. The arrangement and configurations of these components is intended to be illustrative and is not intended to be limiting. These components include a pump motor having an attached cooling fan (not shown). The pump motor is attached to a compressor pump by gears (not shown). FIG. 7 is a cross-section through a kit housing 100. The bottom surface of the kit housing 102 is shown. The kit includes an internal sealant hose nozzle 104. The sealant hose nozzle 104 connects to the sealant assembly. The diverter valve is also fluidly connected with the connecting port 76 of the receptacle 74—as shown in FIG. 6—by way of the internal sealant hose nozzle 104.

With further reference to FIGS. 7-8, sealant assembly is removably attachable to the kit housing 100 though connecting port 76. The housing 100 includes a slidable retaining member 108 that is spring-biased with respect to the kit housing by resilient members 112 and 112'. Retaining member 108 includes an oval-shaped aperture 110 designed to be slightly larger than connecting port 76. Resilient members 112, 112' are seated at an end 106 of housing 100. Sliding retaining member 108 is linked to button 43 (as shown in FIG. 8). In FIG. 7, the release tool 42 at the end of valve connector 40 is not applied to the retaining member 108. Sealant assembly connecting port 76 is in a locked position. In FIG. 8, the release tool 42 is applied to the retaining member 108 and the sealant assembly connecting port 76 is in a locked position.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A temporary mobility kit for use in repairing a leak in a tire, the tire having a tire valve, the temporary mobility kit comprising:
    a switch-inflator assembly, said switch-inflator assembly including an air inflator pump and an air inflator hose;
    a sealant assembly, said sealant assembly including a source of tire sealant and a sealant hose, said sealant hose including a switch arrangement for electrically confirming positive attachment of said sealant hose to the tire valve of the tire;
    a diverter switch operatively associated with said switch-inflator assembly for enabling a user to select between a tire inflation function and a tire sealing function; and
    a circuit electrically connecting said inflator pump, said switch arrangement of said sealant hose, and said diverter switch, whereby said circuit includes a logic which prevents the inadvertent outflow of tire sealant;
    wherein said switch arrangement of said sealant hose includes a tire valve connection end having a first electrical lead operatively connecting said tire valve connection end and said circuit, and a second electrical lead operatively connecting said tire valve connection end and said circuit; and
    wherein said tire valve connection end includes a metal collar and a metal flange, said metal flange being centrally located with respect to said metal collar, said first electrical lead being connected to said metal collar and said second electrical lead being connected to said metal flange.

2. The temporary mobility kit of claim 1, wherein said sealant assembly is removably attachable to said switch-inflator assembly.

3. The temporary mobility kit of claim 1, wherein said circuit includes a logic circuit, a pump switch circuit, a switch and logic circuit, and a reset circuit.

4. The temporary mobility kit of claim 3, wherein said logic circuit collects all input signals generated by one or more of said pump switch circuit, said switch and logic circuit, and said reset circuit.

5. The temporary mobility kit of claim 4, further including an on-off button and wherein said pump switch circuit measures the signal of said on-off button and provides information to said logic circuit.

6. The temporary mobility kit of claim 5, wherein said on-off button is a momentary switch which changes the status of said logic circuit from "0" to "1" and from "1" to "0".

7. The temporary mobility kit of claim 6, wherein said switch and logic circuit measures signals from said diverter switch and from said switch arrangement of said sealant hose.

8. The temporary mobility kit of claim 7, wherein said switch and logic circuit inputs a signal to said logic circuit and said reset circuit based upon signals received from said diverter switch and said switch arrangement of said sealant hose, whereby a combination of said two signals functions to restrict the inadvertent outflow of sealant compound from said temporary mobility kit.

9. The temporary mobility kit of claim 8, wherein said temporary mobility kit further includes a power line and wherein said reset circuit receives power from said power line and wherein said reset circuit resets operation of said air inflator pump when electrical power is provided to said temporary mobility kit or when there is a change in status of said switch and logic circuit.

10. A temporary mobility kit for use in repairing a leak in a tire, the tire having a tire valve, the temporary mobility kit comprising:
    an inflator pump;
    a source of a tire sealant fluidly connected to said inflator pump, said source of tire sealant having a sealant hose, said sealant hose including a switch arrangement for electrically confirming positive attachment of said sealant hose to the tire valve of the tire; and
    a circuit electrically connecting said inflator pump and said switch arrangement of said sealant hose;
    wherein said switch arrangement of said sealant hose includes a tire valve connection end having a first electrical lead operatively connecting said tire valve connection end and said circuit, and a second electrical lead operatively connecting said tire valve connection end and said circuit; and
    wherein said tire valve connection end includes a metal collar and a metal flange, said metal flange being centrally located with respect to said metal collar, said first electrical lead being connected to said metal collar and said second electrical lead being connected to said metal flange.

11. The temporary mobility kit of claim 10, further including a diverter switch operatively associated with said inflator pump for enabling a user to select between a tire inflation function and a tire sealing function.

12. The temporary mobility kit of claim 11, wherein said diverter switch is electrically connected with said circuit.

13. The temporary mobility kit of claim 12, wherein said circuit further includes a logic which prevents inadvertent outflow of tire sealant.

14. The temporary mobility kit of claim 12, wherein said circuit includes a logic circuit, a pump switch circuit, a switch and logic circuit, and a reset circuit.

15. The temporary mobility kit of claim 14, further including a power line and an on-off button, said on-off button being a momentary switch which changes the status of said logic circuit from "0" to "1" and from "1" to "0", wherein said logic circuit collects all input signals generated by one or more of said pump switch circuit, said switch and logic circuit, and said reset circuit, said pump switch circuit measures the signal of said on-off button and provides information to said logic circuit, said switch and logic circuit measures signals from said diverter switch and from said switch arrangement of said sealant hose, said switch and logic circuit inputs a signal to said logic circuit and said reset circuit based upon signals received from said diverter switch and said switch arrangement of said sealant hose, whereby a combination of said two signals functions to restrict inadvertent outflow of sealant compound from said temporary mobility kit, said reset circuit receives power from said power line and further wherein said reset circuit resets operation of said air inflator pump when electrical power is provided to said temporary mobility kit or when there is a change in status of said switch logic circuit.

16. A method of preventing the inadvertent outflow of tire sealant from a temporary mobility kit, the method comprising the steps of:

forming a temporary mobility kit comprising a switch-inflator assembly, said switch-inflator assembly including an air inflator pump and an air inflator hose, a sealant assembly, said sealant assembly including a source of tire sealant and a sealant hose, said sealant hose including a switch arrangement for electrically confirming positive attachment of said sealant hose to the tire valve of the compromised tire, a diverter switch operatively associated with said switch-inflator assembly for enabling a user to select between an air inflation function and a sealing function, and a circuit electrically connecting said inflator pump, said switch arrangement of said sealant hose, and said diverter switch, whereby said circuit includes a logic configured to prevent inadvertent outflow of tire sealant;

configuring the switch arrangement with a tire valve connection end having a first electrical lead operatively connecting said tire valve connection end and said circuit, and a second electrical lead operatively connecting said tire valve connection end and said circuit;

wherein said tire valve connection end includes a metal collar and a metal flange, said metal flange being centrally located with respect to said metal collar, said first electrical lead being connected to said metal collar and said second electrical lead being connected to said metal flange;

attaching said sealant hose to the tire valve of a compromised tire, thereby causing said switch arrangement of said sealant hose to become engaged;

switching said diverter switch to said sealing function; and activating said switch-inflator assembly to cause a flow of tire sealant from said source of tire sealant through said sealant hose and into the compromised tire.

\* \* \* \* \*